United States Patent
Barngrover et al.

(10) Patent No.: US 11,428,802 B2
(45) Date of Patent: Aug. 30, 2022

(54) LOCALIZATION USING PARTICLE FILTERING AND IMAGE REGISTRATION OF RADAR AGAINST ELEVATION DATASETS

(71) Applicant: United States of America as represented by the Secretary of the Navy, San Diego, CA (US)

(72) Inventors: Christopher Michael Barngrover, San Diego, CA (US); Amin Mohammad Rahimi, San Diego, CA (US); Jacoby Ryan Larson, Surprise, AZ (US); Julian Yousif Raheema, El Cajon, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 224 days.

(21) Appl. No.: 16/902,581

(22) Filed: Jun. 16, 2020

(65) Prior Publication Data

US 2021/0389451 A1 Dec. 16, 2021

(51) Int. Cl.
*G01S 13/90* (2006.01)
*G01S 7/04* (2006.01)
*G01S 13/86* (2006.01)
*G01S 13/00* (2006.01)

(52) U.S. Cl.
CPC ............ *G01S 13/9021* (2019.05); *G01S 7/04* (2013.01); *G01S 13/86* (2013.01)

(58) Field of Classification Search
CPC ........ G01S 13/9021; G01S 7/04; G01S 13/86; G01S 7/2955; G01S 7/412
See application file for complete search history.

(56) References Cited

U.S. PATENT DOCUMENTS

| | | | | |
|---|---|---|---|---|
| 5,566,073 A | * | 10/1996 | Margolin | G06T 17/05 340/995.18 |
| 5,995,903 A | * | 11/1999 | Smith | G06T 17/05 340/995.26 |
| 8,154,438 B1 | | 4/2012 | Larson | |
| 10,209,081 B2 | * | 2/2019 | Ghadiok | G01C 21/28 |
| 10,430,968 B2 | * | 10/2019 | Houts | G01S 17/89 |

(Continued)

OTHER PUBLICATIONS

J. Sarvaiya, et al., "Image Registration Using Log Polar Transform and Phase Correlation to Recover Higher Scale" Journal of Pattern Recognition Research pp. 90-105 (2012).

*Primary Examiner* — Bernarr E Gregory
(74) *Attorney, Agent, or Firm* — Naval Information Warfare Center Pacific; Kyle Eppele; James R. McGee

(57) ABSTRACT

A system for localization includes a radar, a database, a simulator, a registrar, and a filter. The radar is positioned at a disposed location requiring localization. The radar generates a radar image scanning a proximity around the disposed location. The database stores features of a landmass. The simulator generates synthesized images of the features that the radar is predicted to generate from corresponding viewpoints. The registrar calculates respective correlation indicators between the radar image and each synthesized image. The filter sets a pose estimate of the disposed location to an average of those viewpoints from which correspond the synthesized images having the best or better ones of the correlation indicators.

20 Claims, 5 Drawing Sheets

(56) References Cited

U.S. PATENT DOCUMENTS

| 11,125,567 B2 * | 9/2021 | Kim ........................ G01S 7/412 |
| 2009/0228204 A1 * | 9/2009 | Zavoli .................... G01C 21/30 |
| | | 701/532 |

* cited by examiner

LOCALIZATION USING PARTICLE FILTERING AND IMAGE REGISTRATION OF RADAR AGAINST ELEVATION DATASETS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 106551.

BACKGROUND OF THE INVENTION

Global Positioning Satellites (GPS) provide an accurate and low-cost solution for localization in both military and commercial applications. However, because GPS uses low-power radio signals, GPS is highly susceptible to denial attacks.

In the absence of GPS, vehicles commonly rely on inertial measurement devices, such as accelerometers and gyroscopes, fused using a Kalman filter. While this provides for very accurate estimate of changes in position over a short time interval, these sensors tend to have a substantial amount of intrinsic noise, which, through constant integration by the Kalman filter, manifest as large unbounded drifts in position estimates over time.

Modern celestial navigation solutions, such as System to Estimate Latitude and Longitude Astronomically (STELLA), provide consistent accuracy within 2 nautical miles, and in some circumstances within 100 meters, but fail in cloudy conditions, are expensive, and require additional hardware. Celestial navigation is also susceptible to large errors caused by poorly estimated vehicle attitude.

Radio direction finding continues operating in cloudy conditions using beacons or signals of opportunity. However, specialized equipment is required and accuracy is proportional to the distance from the signal source.

A localization system is needed that provides consistent accuracy in a variety of conditions, including when GPS is unavailable.

SUMMARY

A system for localization includes a radar, a database, a simulator, a registrar, and a filter. The radar is positioned at a disposed location requiring localization. The radar generates a radar image scanning a proximity around the disposed location. The database stores features of a landmass. The simulator generates synthesized images of the features that the radar is predicted to generate from corresponding viewpoints. The registrar calculates respective correlation indicators between the radar image and each synthesized image. The filter sets a pose estimate of the disposed location to an average of those viewpoints from which correspond the synthesized images having the best or better ones of the correlation indicators.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and processes below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other systems and processes described herein as will be understood by one of ordinary skill in the art unless otherwise stated specifically.

Figure 1:
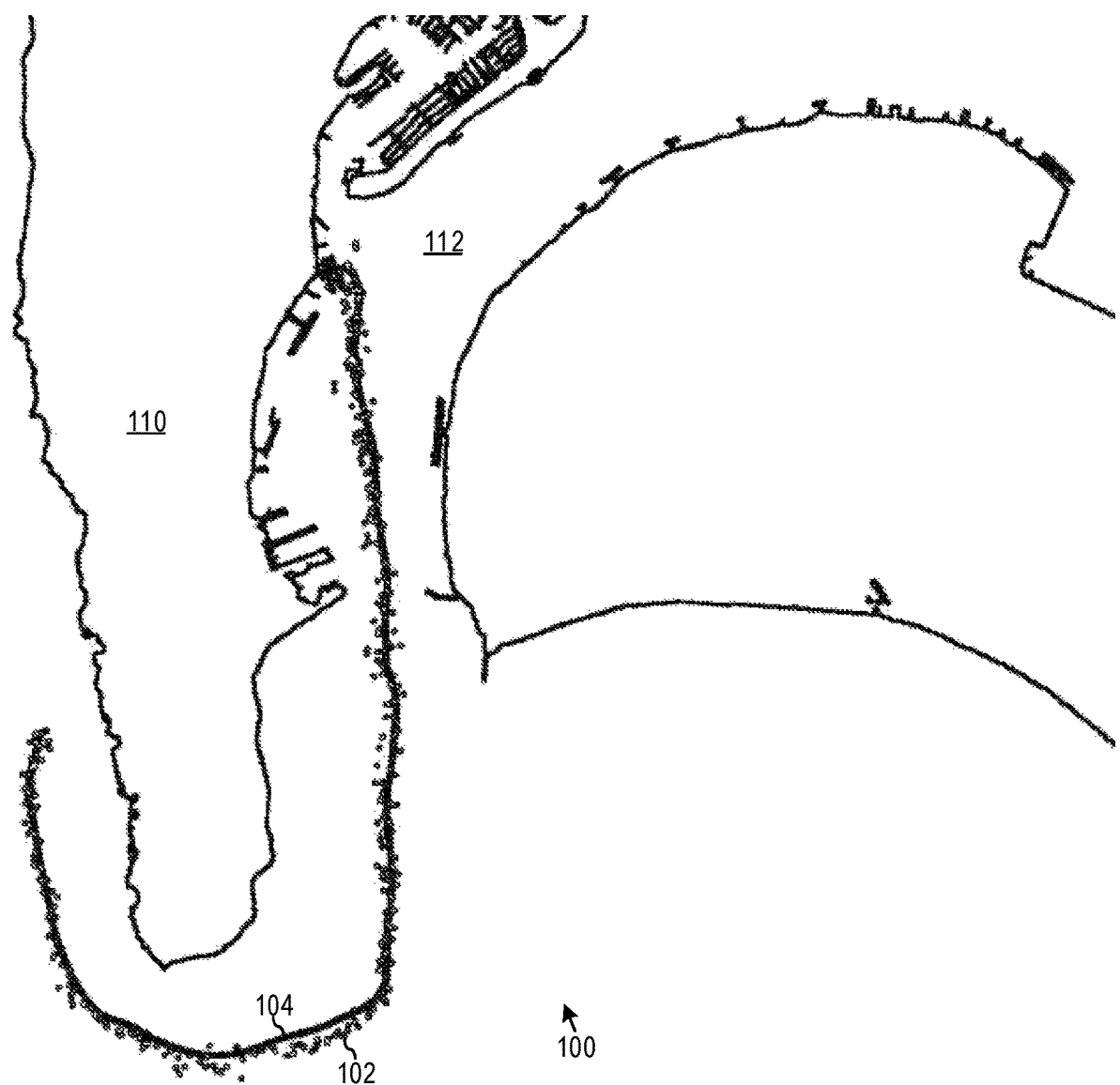
FIG. 1 is a plot of a series of pose estimates from a system for localization in accordance with an embodiment of the invention.

FIG. 1 is a plot 100 of a series of pose estimates from a system for localization in accordance with an embodiment of the invention. Dots 102 represent the pose estimates from a prototype system, and for comparison, line 104 represents the GPS location, during a 4.3 nautical mile run around Point Loma 110 into the harbor 112 at San Diego, Calif. The prototype system was demonstrated using a Furuno® FAR 2117-BB radar that was already installed on a 22-foot Boston Whaler® maritime vehicle, achieving localization with a position error consistently bounded below 90 meters from true position.

An advantage of certain embodiments of the invention is the simple upgrade that merely attaches a computer module to the radar system typically already installed in a maritime or aerospace vehicle; no additional sensors are required. Because all processing is done onboard the vehicle, no communication with external sources is required. The localization system is not susceptible to drift over time and even accurately provides latitude, longitude, and heading with no prior knowledge of the vehicle's position. The localization system provides consistent accuracy in a wide variety of conditions, including when the weather is inclement and/or when GPS is unavailable.

Figure 2:
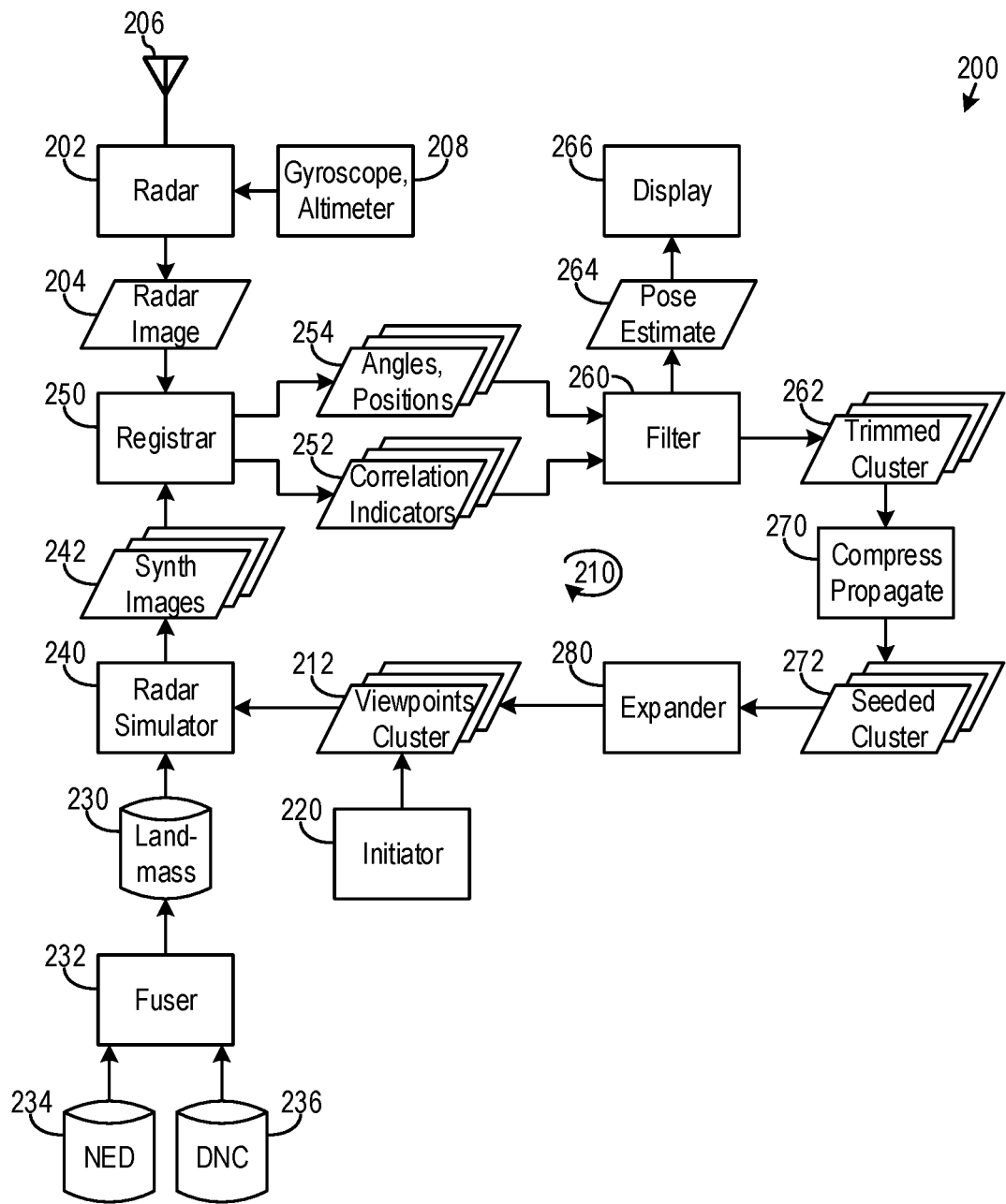
FIG. 2 is a block diagram of a system for localization of a radar in accordance with an embodiment of the invention.

FIG. 2 is a block diagram of a system 200 for localization of a radar in accordance with an embodiment of the invention.

The localization system 200 includes radar 202 that is disposed at a location requiring localization. Typically, radar 202 is installed in a vehicle, such as a maritime or aerospace vehicle, and the system 200 determines the location of the vehicle by determining the location of its onboard radar 202. Radar 202 captures a radar image 204 in a series of radar images with each radar image 204, in a typical embodiment, capturing a sweep of 360 degrees scanning a proximity around the vehicle during a corresponding rotation of 360 degrees of radar antenna 206. In another embodiment, radar image 204 has asymmetry, such as a forward-looking radar image. In certain embodiments, radar 202 interoperates with a gyroscope sensor 208 to correct each scanned radar image 204 for rotations of a vehicle carrying radar 202 and gyroscope 208. In aerospace embodiments, sensor 208 also includes an altimeter.

In one embodiment, the time to perform the computer calculations required to perform one iteration around loop 210 is matched to less than the time to capture each radar image 204. Thus, each iteration of loop 210 inputs an updated radar image 204 in the series of radar images. It will be appreciated that the vehicle generally moves between the radar images in the series, and this movement affects the captured radar image 204.

Figure 3A:
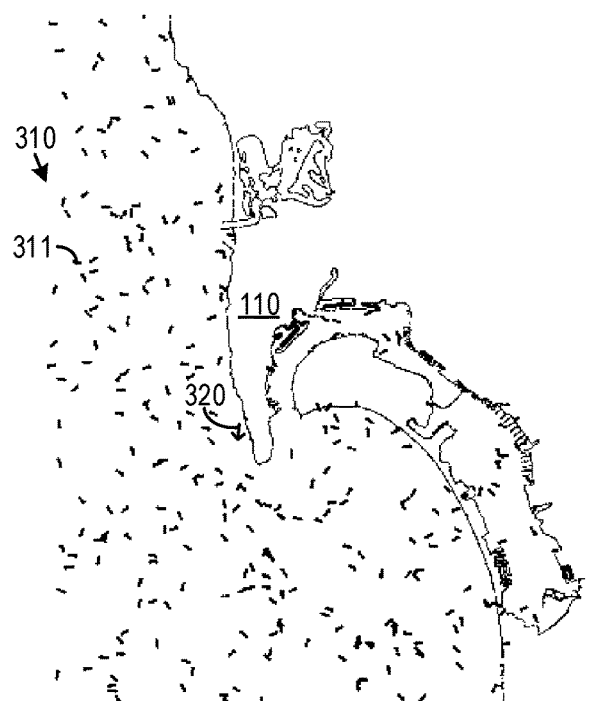
FIG. 3A-D are plots of a series of clusters of viewpoints converging on a pose estimate from a system for localization in accordance with an embodiment of the invention.

When iteration around loop 210 begins with no prior knowledge of the vehicle's position, initiator 220 initializes the data processed around loop 210. Although the data processing could be initialized at any point around loop 210, good results are obtained when initiator 220 initializes the clusters 212 of viewpoints in one embodiment. A viewpoint is a proposed trial location of radar 202, and optionally includes a viewing direction, such as an orientation or heading of a vehicle carrying the radar 202. When there is no prior knowledge of the vehicle's position, initiator 220 initializes viewpoint clusters 212 to random viewpoints that are uniformly distributed within an area within a range of the radar 202 from a landmass. FIG. 3A shows the initial random viewpoints 310 for the maritime run shown in FIG. 1 with the initial random viewpoints 310 uniformly distributed across the ocean and harbor areas within a range of the radar 202 from the landmass including Point Loma 110. Each of the initial random viewpoints 310 is shown as a bar, such as bar 311, indicating a position and an orientation of the viewpoint.

Usually, each cluster of viewpoint clusters 212 includes multiple viewpoints in a distribution around a central point. However, initiator 220 instead initializes each cluster of viewpoint clusters 212 to exactly one viewpoint in this embodiment. This initializes both the clusters 212 and the viewpoints within the clusters 212. Thus, in the example of FIG. 3A, each of the initial random viewpoints 310 seeds a respective one of the viewpoint clusters 212.

Database 230 stores features of the landmass. In one maritime embodiment, the disposed location requiring the localization is in a littoral water, and fuser 232 fuses elevation data describing a coastline adjacent the littoral water from National Elevation Dataset (NED) 234 of the United States Geologic Survey and shoreline data describing the coastline from Digital Nautical Charts (DNC) 236. Fuser 232 overlays elevation data from the NED 234 over polygons from the DNC 236. Fuser 232 masks elevation data from the NED 234 in the ocean and other water areas outside the polygons of the DNC 236.

Radar simulator 240 generates synthesized images of the features from database 230 that the radar 202 is predicted to generate from the viewpoints within viewpoint clusters 212. Each image cluster of image clusters 242 includes a synthesized image that radar 202 is predicted to generate from each viewpoint in a corresponding viewpoint cluster of viewpoint clusters 212. In one embodiment, simulator 240 predicts a reflection from the features of the landmass of a radar signal from the radar antenna 206 when the radar 202 is positioned at each viewpoint within viewpoint clusters 212 with the radar 202 oriented in a reference direction, such a vehicle carrying radar 202 having a heading of true north. In this embodiment, simulator 240 accounts for power loss from propagation of the radar signal from radar antenna 206, obstruction of the radar signal from the features, angles of incidence between the radar signal and the features, a beam width of the radar signal, a rate of the scanning of the radar signal, and height or altitude of the radar antenna 206 relative to the landmass. In another embodiment, simulator 240 also accounts for radar asymmetry including asymmetry dependent upon vehicle orientation, such as forward-looking radar or ghost images due to reflections from the vehicle.

Registrar 250 calculates transformations that rotate and translate the radar image 204 to maximize a correlation between a respective transformation of the radar image 204 and each synthesized image in image clusters 242. Thus, registrar 250 calculates respective correlation indicators between the radar image 204 and the synthesized images in image clusters 242. A correlation cluster of correlation clusters 252 includes the respective correlation indicator for each synthesized image that the radar 202 is predicted to generate from the viewpoints in the corresponding viewpoint cluster of viewpoint clusters 212. As detailed below in the discussion of FIG. 5, registrar 250 also calculates data clusters 254 specifying a rotation between the radar image 204 and each synthesized image in image clusters 242 and specifying a translation between this rotation of the radar image 204 and this synthesized image.

Filter 260 selects the best one or better ones of the respective correlation indicators in the correlation clusters 252. This selects the synthesized images in image clusters 242 having the best or better correlations with the radar image 204, and therefore selects from viewpoint clusters 212 those corresponding viewpoints of the selected synthesized images. In one embodiment, filter 260 selects the viewpoints in trimmed clusters 262 from which the synthesized images in image clusters 242 have the respective correlation indicators above a threshold in the correlation clusters 252. Filter 260 updates the location of the selected viewpoints in trimmed clusters 262 with the rotation angles and/or translation positions from data clusters 254.

The trimmed clusters 262 include a respective cluster for each of the viewpoint clusters 212, except that when filter 260 selects zero viewpoints for a particular cluster of viewpoint clusters 212, this particular cluster is deleted from trimmed clusters 262. Because on the first iteration of loop 210 every viewpoint cluster of the initial viewpoint clusters 212 has a single viewpoint, filter 260 usually deletes most of the initial viewpoint clusters 212 from trimmed clusters 262 during the first iteration of loop 210. During subsequent iterations of loop 210, the number of trimmed clusters 262 monotonically decreases until the remaining cluster or clusters converge at the location of radar 202.

Filter 260 also outputs a pose estimate 264 of the disposed location of radar 202. The pose estimate 264 is an average over the trimmed viewpoints in trimmed clusters 262 that includes the rotation angles and/or translation positions from data clusters 254. In one embodiment, the pose estimate 264 is displayed on a display 266 to show an estimated position and an estimated heading of a vehicle relative to the features of the landmass from database 230.

In one embodiment, filter 260 calculates a confidence averaging the correlation indicators of the viewpoints in trimmed clusters 262 and displays the confidence on display 266 as an error bar or error circle, and, when the confidence is high at a position sufficiently close to the landmass, the filter 260 controls the radar 202 to decrease range and thereby increase radar resolution to enhance localization accuracy in future iterations of loop 210.

Compressor 270 averages the viewpoints in each of trimmed clusters 262 to a single viewpoint in a corresponding seeded cluster of seeded clusters 272. This is trivial during the first iteration of loop 210 because each of trimmed clusters 262 already has a single viewpoint. During subsequent iterations of loop 210, compressor 270 averages the viewpoints in each of trimmed clusters 262 to produce the single viewpoint in a corresponding seeded cluster of seeded clusters 272. This averaging typically further propagates the viewpoints to implement a particle filter. For example, when a particular cluster of viewpoint clusters 212 includes a distribution of viewpoints, but filter 260 selects only the viewpoints along the eastern side of the distribution for this particular cluster, then the single viewpoint in the corresponding cluster of seeded clusters 272 moves eastward. This propagation together with propagation with the translation positions from data clusters 254 enables iteration of loop 210 to converge to the actual location of radar 202 and for continued iteration of loop 210 to track movement of radar 202 reflected in the current radar image 204.

In one embodiment, compressor 270 also averages the respective correlation indicators from correlation clusters 252 over the viewpoints in each of trimmed clusters 262 to produce a confidence indicator for the corresponding seeded cluster of seeded clusters 272.

Expander 280 perturbs the seeded viewpoint in each of seeded clusters 272. This produces distributed viewpoints reinitializing the corresponding cluster in viewpoint clusters 212. In one embodiment, from the seeded viewpoint in each of seeded clusters 272, expander 280 produces thirty-two distributed viewpoints having a normal distribution around the seeded viewpoint with a standard deviation inversely proportional to the confidence indicator for the seeded cluster. The resulting viewpoint clusters 212 reinitialize a subsequent iteration of loop 210.

FIG. 3A-D are plots of a series of clusters of viewpoints converging on a pose estimate from a system for localization in accordance with an embodiment of the invention.

As discussed above, FIG. 3A shows the initial random viewpoints 310 for the maritime run shown in FIG. 1 that initialize the viewpoint clusters 212 of FIG. 2. Each of the initial random viewpoints 310 is shown as a bar, such as bar 311, indicating a position and an orientation (with 180 degree ambiguity because direction arrows are omitted) of the viewpoint. FIG. 3A also shows the actual initial position and actual initial heading of the maritime vehicle 320.

Figure 3B:
Figure 3C:
Figure 3D:
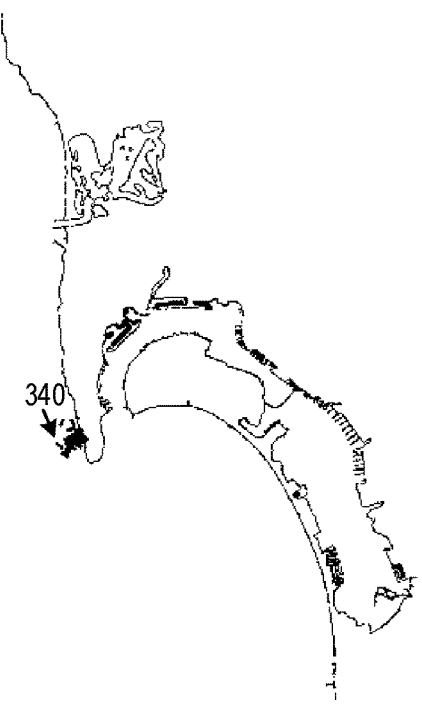

After one iteration of the loop 210 of FIG. 2, the distributed viewpoints of the remaining viewpoints clusters 212 have the distributions shown in FIG. 3B having slightly more than a dozen of viewpoints clusters 212 including the example viewpoint cluster 330. Like the example viewpoint cluster 330, each of the viewpoints clusters 212 includes thirty-two distributed viewpoints. After the second iteration of the loop 210 of FIG. 2, the distributed viewpoints of the remaining about eight viewpoint clusters 212 have the distributions shown in FIG. 3C. The third iteration is not shown. However, after the fourth iteration of the loop 210 of FIG. 2, FIG. 3D shows the distributed viewpoints of the single remaining viewpoint cluster 340 of viewpoint clusters 212 have their distribution converged on the actual position of the maritime vehicle 320. Less clearly shown in FIG. 3A-D is that the distribution of orientations of the remaining viewpoint cluster 340 also converges on the actual heading of the maritime vehicle 320. Each iteration of loop 210 outputs one of the pose estimates of dots 102 of FIG. 1 describing the travel over the disposed locations of the maritime vehicle 320.

Figure 4:
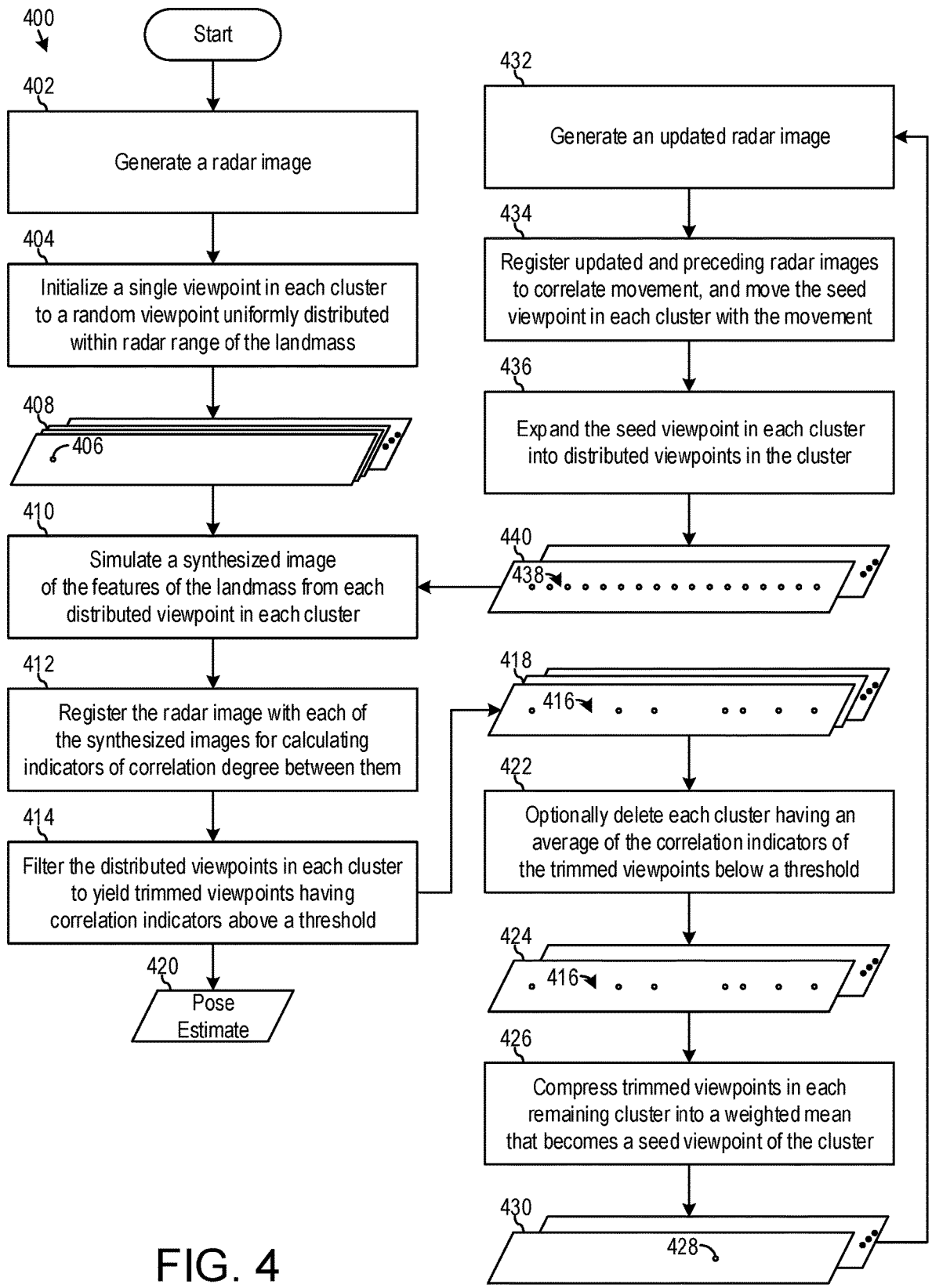
FIG. 4 is a data flow diagram of a process for localization in accordance with an embodiment of the invention.

FIG. 4 is a data flow diagram of a process 400 for localization in accordance with an embodiment of the invention.

At step 402, an initial radar image is generated. At step 404, a single random viewpoint 406 is initialized in each of clusters 408. The random viewpoints in clusters 408 are uniformly distributed over an area or airspace within radar range of the landmass.

At step 410, a synthesized image is simulated of the features of the landmass from the viewpoint 406 in each of clusters 408 of an initial set in a series, and, when process 400 iterates back to step 410, from each of the viewpoints 438 in each of clusters 440 for each subsequent set in the series.

At step 412, the current radar image from step 402 or step 432 is registered with each of the synthesized images of each set in the series, including calculating rotation angles and translation positions for each synthesized image. Also calculated are indicators of correlation degree between the current radar image and the synthesized images.

At step 414, the distributed viewpoints, from viewpoint 406 in clusters 408 for an initial set in the series or from viewpoints 438 in clusters 440 for each subsequent set in the series, are filtered to produce trimmed viewpoints 416 in each of trimmed clusters 418. In one embodiment, the trimmed viewpoints 416 in trimmed clusters 418 have correlation indicators from step 412 above a threshold. When a particular cluster of clusters 408 or 440 is trimmed to include no viewpoints, this particular cluster is deleted, such that trimmed clusters 418 then have fewer clusters than clusters 408 or 440. The trimmed viewpoints 416 in trimmed clusters 418 are updated with the rotation angles and translation positions calculated in step 412 in one embodiment.

Step 414 also calculates a pose estimate 420 that is an average of the trimmed viewpoints 416 in trimmed clusters 418. In one embodiment, pose estimate 420 is a weighted mean of the trimmed viewpoints 416 in trimmed clusters 418. The weighted mean has weights of the trimmed viewpoints 416 in trimmed clusters 418 proportional to their respective correlation indicators from step 412.

At optional step 422, certain of the trimmed clusters 418 are deleted when they have an average of their correlation indicators from step 412 below a threshold. Thus, there are potentially fewer clusters 424 than trimmed clusters 418, but each of trimmed clusters 418 remaining in clusters 424 includes the same trimmed viewpoints 416.

At step 426, the trimmed viewpoints 416 in each of clusters 424 are compressed into a single seed viewpoint 428 in a corresponding one of seeded clusters 430. In one embodiment, seed viewpoint 428 in each of seeded clusters 430 is a weighted mean of the trimmed viewpoints 416 in the corresponding one of clusters 424. The weighted mean has weights of the trimmed viewpoints 416 proportional to the respective correlation indicators from step 412 in one embodiment. In this particle filter, the location of seed viewpoint 428 in surviving clusters 430 generally propagates each iteration of step 426 to converge at the true location while tracking movement of the radar.

At step 432, the radar image is updated with an updated radar image reflecting any movement of the radar. At step 434, this movement is estimated from registering the updated and preceding radar images to maximize correlation, and the seed viewpoint 428 in each of seeded clusters 430 is moved correspondingly to help track movement of the radar while also helping ensure the seeded clusters 430 do not become stuck in a region where registration consistently fails at step 412. The registration at step 434 is similar to the registration at step 412 described below in the discussion of FIG. 5.

At step 436, the seeded clusters 430 are each expanded from the single seed viewpoint 428 to the distributed viewpoints 438 in the viewpoint clusters 440. In one embodiment, the single seed viewpoint 428 in each of seeded clusters 430 is expanded into thirty-two distributed viewpoints 438 in a normal distribution around the seed viewpoint 428. In certain maritime embodiments, the distributed viewpoints 438 are distributed in two dimensions as shown in FIGS. 3B, 3C, and 3D because the radar antenna has a fixed height. In certain aerospace embodiments, an altimeter provides an initial estimate of the height of the radar for the initial random viewpoint 406 in each of clusters 408, but the distributed viewpoints 438 are distributed in three dimensions in the airspace above the landmass to enhance localization of the altitude of the aerospace vehicle, especially when the altimeter is a pressure-based altimeter with accuracy impacted by weather, such as when the aerospace vehicle flies through a pressure-changing storm front.

After step 436, process 400 returns to step 410 to simulate a synthesized image for the next set of the viewpoint clusters 440.

Figure 5:
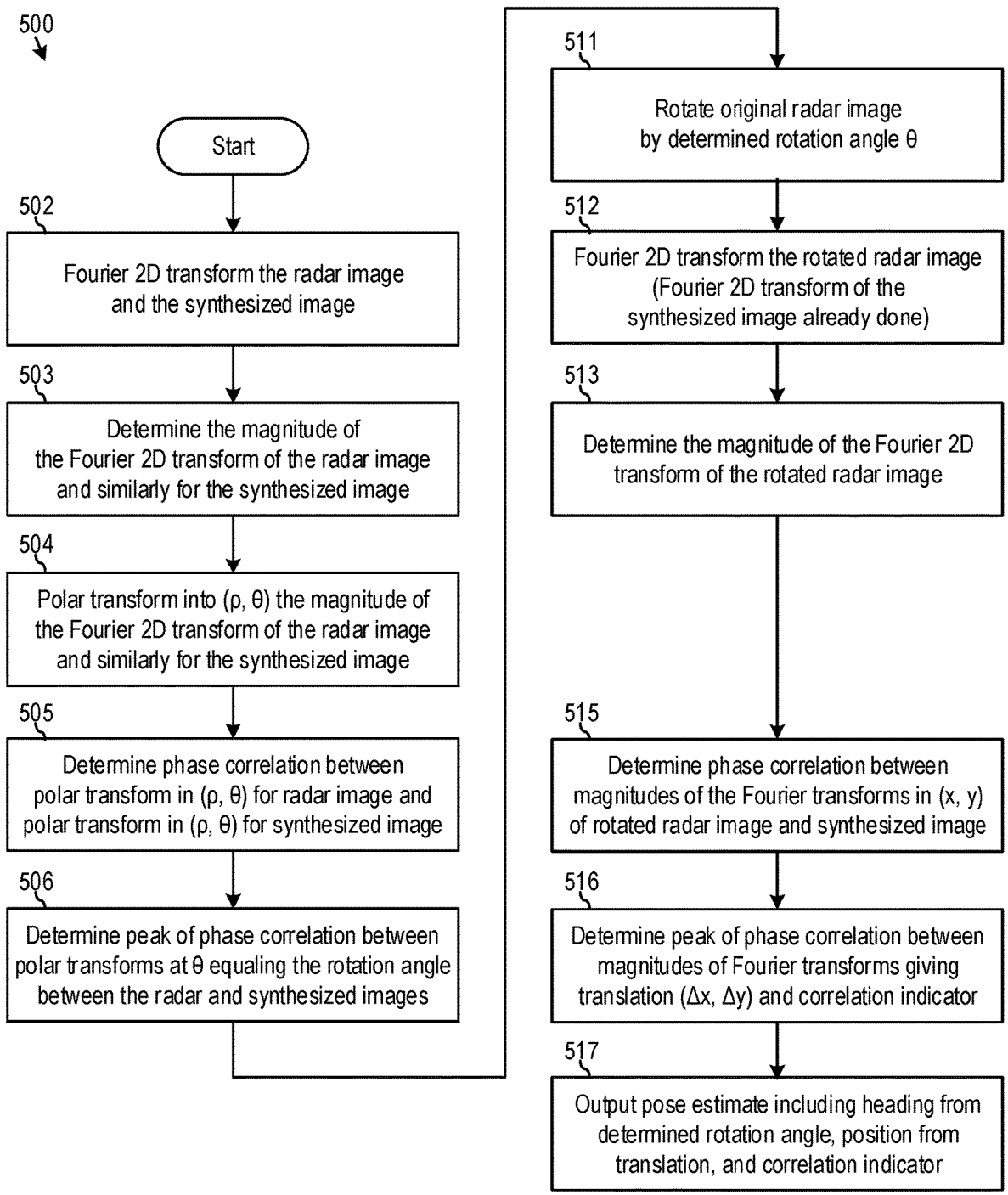
FIG. 5 is a flow diagram of a process for registration of a radar image and a synthesized image in accordance with an embodiment of the invention.

FIG. 5 is a flow diagram of a process 500 for registration of a radar image and a synthesized image in accordance with an embodiment of the invention. When a radar image is registered with multiple synthesized images, process 500 is repeated for each synthesized image. Process 500 includes certain concepts summarized in Sarvaiya, Jignesh N et al., "Image Registration Using Log Polar Transform and Phase Correlation to Recover Higher Scale;" however, although these concepts include polar coordinates ($\rho$, $\theta$) only over $0 \leq \rho \leq R$ and $0 \leq \theta \leq 2\pi$, in contrast certain embodiments of the invention instead have polar coordinates ($\rho$, $\theta$) over $-R \leq \rho \leq R$ and $0 \leq \theta \leq \pi$. This permits simultaneous registration of radar signals in opposite directions, which improves localization, especially for maritime vehicles enclosed in a harbor and for aerospace vehicles generally.

At step 502, the Fourier 2D transform in (x, y) is calculated for both the radar image and for the synthesized image. At step 503, the magnitude is determined for the Fourier 2D transform of the radar image. Similarly, the magnitude is determined for the Fourier 2D transform of the synthesized image. This discards phase information from the Fourier 2D transforms.

At step 504, the polar transform is calculated for the magnitude of the Fourier 2D transform of the radar image. Similarly, the polar transform is calculated for the magnitude of the Fourier 2D transform of the synthesized image. This transforms from Cartesian (x, y) coordinates of the Fourier 2D transforms to polar ($\rho$, $\theta$) coordinates. In another embodiment, the radar and synthesized images are generated in polar coordinates so no polar transform is required, but instead Cartesian transforms into (x, y) coordinates are required before step 515. Note that the rotating antenna and radial echoes of typical radars makes polar coordinates straightforward for radar images.

At step 505, the phase correlation is determined between the polar transform in ($\rho$, $\theta$) for the radar image and the polar transform in ($\rho$, $\theta$) for the synthesized image. The phase correlation includes a Hanning window to remove edge effects in one embodiment. At step 506, the peak is determined in the phase correlation between the polar transforms. This peak is at a value of angle $\theta$ equaling the apparent rotation angle between the radar image and the synthesized image. A height of the peak is an indicator of the degree of correlation specifying a confidence for the apparent rotation angle. When the synthesized image is oriented in a reference direction, such as true north, the value of angle $\theta$ gives an apparent heading relative to the reference direction of a vehicle carrying the radar in one embodiment. In another embodiment with viewpoints including a viewing direction, the value of angle $\theta$ gives an apparent deviation of the viewing direction.

At step 511, the radar image is rotated by the determined rotation angle $\theta$. This de-rotates the radar image relative to the synthesized image.

At step 512, the Fourier 2D transform in (x, y) is calculated for the rotated radar image. At step 513, the magnitude is determined for the Fourier 2D transform of the rotated radar image.

At step 515, the phase correlation is determined between the magnitude of the Fourier 2D transform in (x, y) of the rotated radar image and, from step 503, the magnitude of the Fourier 2D transform in (x, y) of the synthesized image. The phase correlation includes a Hanning window to remove edge effects in one embodiment. At step 516, the peak is determined in the phase correlation of step 515. The value of this peak in (x, y) specifies an apparent translation ($\Delta x$, $\Delta y$) between the radar image and the synthesized image. A height of the peak is an indicator of the degree of correlation specifying a confidence for the apparent translation ($\Delta x$, $\Delta y$).

At step 517, the pose estimate is output. The pose estimate includes the heading determined from the apparent rotation angle, the disposed location positioned at the apparent translation ($\Delta x$, $\Delta y$) from the viewpoint origin of the synthesized image, and a correlation indicator. The correlation indicator includes either one or both of the rotation correlation indicator from step 506 and the translation correlation indicator from step 516, or some combination of both the correlation indicators from steps 506 and 516, such as a root mean square. When process 500 is repeated until the pose estimate converges on the true position, the apparent translation becomes approximately zero. In an embodiment with the viewpoints including a viewing direction, the apparent rotation angle also becomes approximately zero.

From the above description of localization using particle filtering and image registration of radar against elevation datasets, it is manifest that various techniques may be used for implementing the concepts of system 200 without departing from the scope of the claims. The described embodiments are to be considered in all respects as illustrative and not restrictive. The apparatus/process disclosed herein may be practiced in the absence of any element that is not specifically claimed and/or disclosed herein. It should also be understood that system 200 is not limited to the particular embodiments described herein, but is capable of many embodiments without departing from the scope of the claims.

We claim:

1. A system for localization comprising:
   a radar for being positioned at a disposed location requiring the localization, the radar for generating a radar image scanning a proximity around the disposed location;
   a database for storing a plurality of features of a landmass;
   a simulator for generating a plurality of synthesized images of the features that the radar is predicted to generate from a corresponding plurality of viewpoints;
   a registrar for calculating a plurality of respective correlation indicators between the radar image and each one of the synthesized images; and
   a filter for setting a pose estimate of the disposed location to an average of at least one of the viewpoints from which correspond the synthesized images having one or more better ones of the respective correlation indicators.

2. The system of claim 1, wherein the filter is for setting the pose estimate of the disposed location to the one of the viewpoints from which the one of the synthesized images has a best one of the respective correlation indicators.

3. The system of claim 1, wherein the average is a weighted mean of the at least one of the viewpoints, which are a trimmed plurality of the viewpoints from which correspond the synthesized images having the better ones of the respective indicators above a threshold, the weighted mean having a plurality of weights of the trimmed viewpoints proportional to the respective correlation indicators.

4. The system of claim 1, wherein:
the disposed location is one of a plurality of disposed locations in a series describing travel of a vehicle carrying the radar; and
the system is adapted to iterate a plurality of iterations that determine the pose estimate of each of the disposed locations in the series.

5. The system of claim 4, further comprising:
a display for displaying, relative to the features of the landmass, an estimated position and an estimated heading of the vehicle from the pose estimate of each of the disposed locations in the series.

6. The system of claim 1, wherein the viewpoints are in one of a plurality of sets in a series, the system comprising:
the simulator for generating a plurality of synthesized images of the features that the radar is predicted to generate from one or more distributed viewpoints in each of one or more clusters in each set in the series;
the registrar for calculating a plurality of respective correlation indicators between the radar image and each one of the synthesized images from the viewpoints in the clusters in each set in the series;
the filter for selecting zero or more trimmed ones of the viewpoints in each of the clusters in each set in the series, the trimmed viewpoints corresponding to the synthesized images having the respective correlation indicators above a threshold, wherein each of the clusters having zero trimmed viewpoints is deleted;
a compressor for averaging the trimmed viewpoints in each cluster of the clusters in each set in the series to produce a seeded viewpoint replacing the trimmed viewpoints in the cluster, and for averaging the respective correlation indicators of the trimmed viewpoints in the cluster to produce a confidence indicator for the cluster; and
an expander for perturbing the seeded viewpoint in each cluster of the clusters in each set in the series to produce a plurality of the distributed viewpoints initializing the cluster in a next set after the set in the series.

7. The system of claim 6 further comprising:
an initiator for initializing the clusters in an initial set in the series to a plurality of random viewpoints that are uniformly distributed within an area of the localization within a range of the radar from the landmass, each of the random viewpoints seeding the one of the distributed viewpoints in a respective one of the clusters in the initial set; and
the expander for perturbing the seeded viewpoint in each cluster of the clusters in each set in the series to produce the distributed viewpoints having a normal distribution around the seeded viewpoint in the cluster with a standard deviation inversely proportional to the confidence indicator for the cluster.

8. The system of claim 6, wherein for each set in the series, the radar is for generating an update of the radar image scanning the proximity.

9. The system of claim 1, wherein the radar interoperates with a gyroscope to correct the radar image for rotations during the scanning of a vehicle carrying the radar and the gyroscope.

10. The system of claim 1, wherein the simulator predicts a reflection from the features of the landmass of a radar signal from the radar when the radar is positioned at each of the viewpoints with the radar oriented in a reference direction.

11. The system of claim 10, wherein the simulator accounts for power loss from propagation of the radar signal, obstruction of the radar signal from the features, angles of incidence between the radar signal and the features, a beam width of the radar signal, a rate of the scanning of the radar signal, and height of the radar relative to the landmass.

12. The system of claim 1, wherein the registrar calculates a rotation between the radar image and each of the synthesized images, and calculates a translation between the rotation of the radar image and each of the synthesized images.

13. The system of claim 12, wherein the rotation specifies an estimated heading relative to a reference direction of a vehicle carrying the radar.

14. The system of claim 12, wherein the registrar calculates the rotation between the radar image and each synthesized image from a phase correlation between a polar transform of a magnitude of a Fourier transform of the radar image and a polar transform of a magnitude of a Fourier transform of the synthesized image.

15. The system of claim 14, wherein the phase correlation includes a Hanning window to remove edge effects.

16. The system of claim 12, wherein the registrar calculates the translation between the radar image and each synthesized image from a phase correlation between a magnitude of a Fourier transform of the rotation of the radar image and a magnitude of a Fourier transform of the synthesized image, the phase correlation also calculating the respective correlation indicator between the radar image and the synthesized image.

17. The system of claim 1, wherein:
the disposed location requiring the localization is in a littoral water;
the landmass is a coastline adjacent the littoral water; and
the simulator is for generating the synthesized images of the features of the coastline from the corresponding plurality of viewpoints.

18. The system of claim 17, wherein the database includes a fusing of elevation data describing the coastline from National Elevation Dataset (NED) of the United States Geologic Survey and shoreline data describing the coastline from Digital Nautical Charts (DNC), the fusing overlaying elevation data from the NED over polygons from the DNC, including masking elevation data from the NED that lies outside the polygons from the DNC.

19. The system of claim 1 further comprising:
an altimeter for determining an altitude of the disposed location requiring the localization in an airspace, wherein:
the landmass borders the airspace; and
the simulator is for generating the synthesized images of the features of the landmass from the corresponding plurality of viewpoints, which all have approximately the altitude.

20. A system for localization in littoral waters comprising:
a radar for being positioned at a disposed location in the littoral waters, the radar for generating a radar image scanning a proximity around the disposed location;
a database for storing a plurality of features of a coastline adjacent the littoral waters;
a simulator for generating a plurality of synthesized images of the features that the radar is predicted to generate from a corresponding plurality of viewpoints;

a registrar for calculating a plurality of respective correlation indicators between the radar image and each one of the synthesized images; and a filter for setting a pose estimate of the disposed location in the littoral waters to an average of at least one of the viewpoints from which correspond the synthesized images having one or more better ones of the respective correlation indicators.

* * * * *